Patented Sept. 16, 1941

2,256,195

UNITED STATES PATENT OFFICE 2,256,195

MANUFACTURE OF DINITRO-ORTHO-CRESOL

William F. Filbert, Woodbury, N. J., assignor to E. I. du Pont de Nemours & Company, Wilmington, Del., a corporation of Delaware No Drawing. Application May 16, 1939, Serial No. 273,889

5 Claims. (Cl. 260—622)

This invention pertains to a method for the preparation of aromatic nitro compounds, and more particularly to an improved method of producing dinitro-ortho-cresol.

Recently, it has been established that various cresylates, particularly those containing nitro groups, exhibit properties which render them quite attractive for use as ignition agents in electric blasting caps, primers for propellent ammunition, and the like. Some of these desirable cresylates may be prepared from dinitro-ortho-cresol, which has the formula

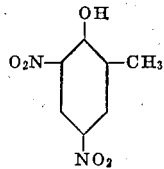

for which the correct desigmition is either 3,5 dinitro - 2 - hydroxyl - 1 - methyl benzene or 4,6 dinitro-ortho-cresol. However, though the compound 4,6 dinitro-ortho-cresol is known, heretofore no entirely satisfactory method for its preparation has been developed, in view of the fact that said methods of preparation are characterized by one or more disadvantages which include low yields, complicated and dangerous procedures, the production of a low-quality product, variations in product, etc. Moreover, since 4,6 dinitro-ortho-cresol is the starting material for the ultimately desired cresylates, the foregoing disadvantages are particularly undesirable, because they tend to become magnified in the production of the desired cresylates.

The object of the present invention is a novel process for producing 4,6 dinitro-ortho-cresol. Another object is a safe and efficient method for producing this material. A further object is a novel method of preparing pure 4,6 dinitro-ortho-cresol. A still further object is a method which permits the production of this material having substantially constant properties. Other objects will become apparent as the invention is disclosed hereinafter.

I have found that the foregoing objects are attained by treating ortho-cresol to form ortho-cresol sulfonic acids and then reacting said ortho-cresol sulfonic acids with nitric acid or its equivalent, while regulating certain conditions present. In effect, the preparation of pure 4,6 dinitro - ortho - cresol involves a three - step process; sulfonation of the ortho-cresol, nitration of the sulfonated product, and purification of the nitrated product.

Sulfonation is effected by reacting, at an elevated temperature, ortho-cresol with concentrated sulfuric acid. This reaction is an exothermic one, whereby considerable heat is evolved. However, the mixture is not cooled during this reaction; instead the temperature is permitted to rise. When the usual proportions of these ingredients are mingled, the original heat of reaction is almost sufficient to carry the temperature to the range desired for carrying out the sulfonation reaction. The preferred range for this reaction lies between 90 and 100° C. and is maintained by supplying external heat.

The sulfonated product is then reacted in dilute solution with nitric acid, while maintaining the reacting mixture at an elevated temperature. This may be done by adding water to the resultant sulfonation product and then adding the requisite amount of nitric acid of relatively high strength to the diluted product; or conversely, the resultant sulfonation product may be added directly to dilute nitric acid. In either instance, the temperature is controlled during the nitration operation. The 4,6 dinitro-ortho-cresol formed is isolated and purified by cooling the nitration mixture while agitating vigorously, and then separating the solid crude material by filtration or decantation. The crude 4,6 dinitro-ortho-cresol, after removal of waste acid is then washed by agitation in hot water at a temperature sufficient to cause the material to be in a molten condition. It is then cooled to a predetermined temperature, while continuing the agitation, whereby a bright yellow granular solid results.

In order to describe the method more in detail, the following examples are given as specific embodiments of our preferred procedure. It is, of course, understood that these examples are cited merely by way of illustration and are not intended to limit the present invention.

Example I

To 1650 gm. of ortho-cresol, contained in a flask, was added 3300 gm. of 93% sulfuric acid, and the two were thoroughly mixed, the temperature of the mixture rising to 95° C. The mixture was maintained at this temperature for one-half hour, following which it was poured into 9500 gm. of vigorously stirred water, the temperature of the diluted mixture being 52° C. Nitric acid of 58.4% strength was added, 2180 gm. of said acid being added quickly, the stirring of the mixture being continued throughout the addition. The temperature of the reaction mixture was allowed to rise to 82° C. Two thousand one hundred and eighty gm. of the same strength nitric acid was then added, at a substantially constant rate, 7.0 minutes being required for this addition. The temperature of the mixture was held between 91-99° C. by external cooling. After all the nitric acid had been added, the temperature was maintained at 95-100° C. during one-half hour following which the reaction mixture was cooled to about 45° C. while stirring vigorously. The oily dinitro-ortho-cresol solidified at about 77° C. It was separated by filtration and washed preliminarily with cold water. It was then agitated with water at a temperature above the fusion point of the material. After the hot water wash, the stirred mixture was cooled to about 50° C. and the granular product separated by filtration. The dried 4,6 dinitro-ortho-cresol weighed 2449 gm. which represents a yield of 81.1% of theoretical. The material was bright yellow in color, and had a freezing point above 83.0° C.

*Example II*

One hundred pounds of sulfuric acid of 93% strength was added gradually to 50 lbs. of liquid ortho-cresol which was vigorously stirred. The reaction was permitted to continue for 15 minutes following this addition, the mixture being agitated vigorously during the entire period. There was no cooling of the reaction mixture, the temperature being permitted to rise at will.

At the expiration of the aforementioned 15-minute period, the sulfonation mixture was poured into a vigorously-stirred mixture containing 186 lbs. of water and 135 lbs. of 60% nitric acid, this mixture having a temperature of 74° C., said temperature being maintained by external cooling. Fifty-five minutes were required for this addition following which nitration was allowed to proceed for an additional 10 minutes. The charge was then cooled to 49° C. and the crude dinitro-ortho-cresol filtered off, the material on the filter being given several cold water washes. It was introduced into a vessel containing 100 lbs. of water heated to about 92° C. which was being stirred actively. Upon addition, the dinitro-ortho-cresol becomes molten almost immediately and is dispersed throughout the water. About 12 minutes were required for addition of all the dinitro-ortho-cresol during which time the temperature is maintained above the melting point of the material. Sufficient cold water was then added to cool the mixture to 74° C., the rate of addition of water being such that the dinitro-ortho-cresol was suitably grained. The temperature was decreased further, solely by external cooling to about 48° C.; the charge was then filtered and washed with cold water. The dinitro-ortho-cresol obtained was a bright yellow granular product, having a melting point of 82.4° C. The weight of the final product represented 77.7% of the theoretical yield for the production of dinitro-ortho-cresol from ortho-cresol.

As stated heretofore, the sulfonation of ortho-cresol is an exothermic reaction. This reaction I carry out by using sulfuric acid of at least 75% strength, the reaction being characterized by a direct combination of the ortho-cresol with concentrated sulfuric acid, without any cooling of the material during the reaction period. Preferably, this reaction is carried out at a temperature between 90° C. and 100° C., said range being effective as well as convenient. Under these conditions sulfonation is obtained quickly, a 15-minute interval being satisfactory. To insure adequate reaction, however, this time limit may be extended somewhat.

In carrying out the nitration reaction, I prefer to employ an amount of nitric acid exceeding that required to nitrate ortho-cresol, because it favors complete nitration. When the nitration is effected in dilute solution, the strength of the nitric acid employed may be varied over a wide range without impairing its efficacy. Preferably, the sulfonation mixture is poured into the nitric acid solution of desired concentration and temperature, the temperature during nitration being controlled by external cooling.

In purifying the 4,6 dinitro-ortho-cresol, I prefer to agitate the nitration mixture while cooling it. When the temperature drops to about 75° C. the dinitro-ortho-cresol solidifies, forming a product of crystalline appearance which may be readily separated. After elimination of the waste acid, which may be effected readily by washing with cold water, the dinitro-ortho-cresol is washed by agitating in water of sufficiently elevated temperature to cause the material to be in a molten condition. This treatment not only is quite efficient in removing any impurities present, but likewise has obvious advantages over the recrystallization purification procedure often employed to purify organic materials.

My novel process may be executed readily because none of the steps thereof is difficult to control. Likewise the time required for production of 4,6 dinitro-ortho-cresol is short. By adoption of the process, a product of high purity, as evidenced by its color and freezing point, may be produced consistently, any variation in quality being substantially eliminated.

It will be evident to those skilled in the art that my disclosure permits of variations without departing from the spirit or scope of the invention. I intend therefore to be limited only in accordance with the following claims.

I claim:

1. A method of preparing 4,6 dinitro-ortho-cresol, which comprises adding sulfuric acid of at least 75% strength to ortho-cresol, permitting the temperature of the mixture to increase, maintaining the temperature of said mixture between 90° C. and 100° C., reacting in dilute solution with at least two molecular equivalents of nitric acid while maintaining the reacting mixture at a temperature of at least 70° C., separating the resulting product and washing said product by agitation in a molten condition with hot water.

2. A method of preparing 4,6 dinitro-ortho-cresol, which comprises reacting at an elevated temperature sulfuric acid of at least 75% strength with ortho-cresol, treating the resultant material in dilute solution with at least two molecular equivalents of nitric acid while maintaining the reacting mixture at a temperature of at least 70° C., separating the product formed, and washing said product by agitation in a molten condition with hot water.

3. A method of preparing 4,6 dinitro-ortho-cresol, which comprises adding sulfuric acid of at least 75% strength to ortho-cresol, permitting the temperature of the mixture to increase, maintaining the temperature of said mixture between 90° C. and 100° C. for at least 15 minutes, reacting the sulfonated product in dilute solution with at least two molecular equivalents of nitric acid while maintaining the reacting mixture at a temperature sufficient to keep said nitration product in molten condition, separating the product formed and washing said product by agitation in a molten condition with hot water.

4. A method of preparing 4,6-dinitro-orthocresol, which comprises reacting at an elevated temperature sulfuric acid of at least 75% strength with ortho-cresol, adding the resulting material to dilute nitric acid containing at least two molecular equivalents of nitric acid, maintaining the mixture at a temperature of at least 70° C., separating the product formed, and washing said product by agitation in a molten condition with hot water.

5. A method of preparing 4,6-dinitro-orthocresol, which comprises reacting at an elevated temperature sulfuric acid of at least 75% strength with ortho-cresol, diluting the resulting material with water, adding thereto at least two molecular equivalents of nitric acid, maintaining the reacting mixture at a temperature of at least 70° C., separating the product formed, and washing said product by agitation in a molten condition with hot water.

WILLIAM F. FILBERT.